UNITED STATES PATENT OFFICE 2,673,867

2,17 ALPHA-DIOXY-3,11,20-TRIKETOALLO-PREGNANES AND PROCESS

George B. Spero and Robert H. Levin, Kalamazoo Township, Kalamazoo County, Mich., assignors to The Upjohn Company, Kalamazoo, Mich., a corporation of Michigan No Drawing. Application January 14, 1953,
Serial No. 331,304

6 Claims. (Cl. 260—397.45)

The present invention relates to certain 2-substituted allo-steroid-triones and is more particularly concerned with 2,17α-dihydroxyallopregnane-3,11,20-trione, 2-acyl esters thereof, and with a process for the production of such compounds.

The novel compounds and the process for the production thereof may be represented by the following structural formulae:

wherein AcO is an acyloxy group, Ac being the acyl radical of an organic carboxylic acid, especially such an acid containing from one to eight carbon atoms, inclusive.

The novel process of the present invention involves heating together, preferably at a temperature between about seventy and 180 degrees centigrade, allopregnane-3,11,20-trione (I) with an excess of an acylating agent, usually an anhy-

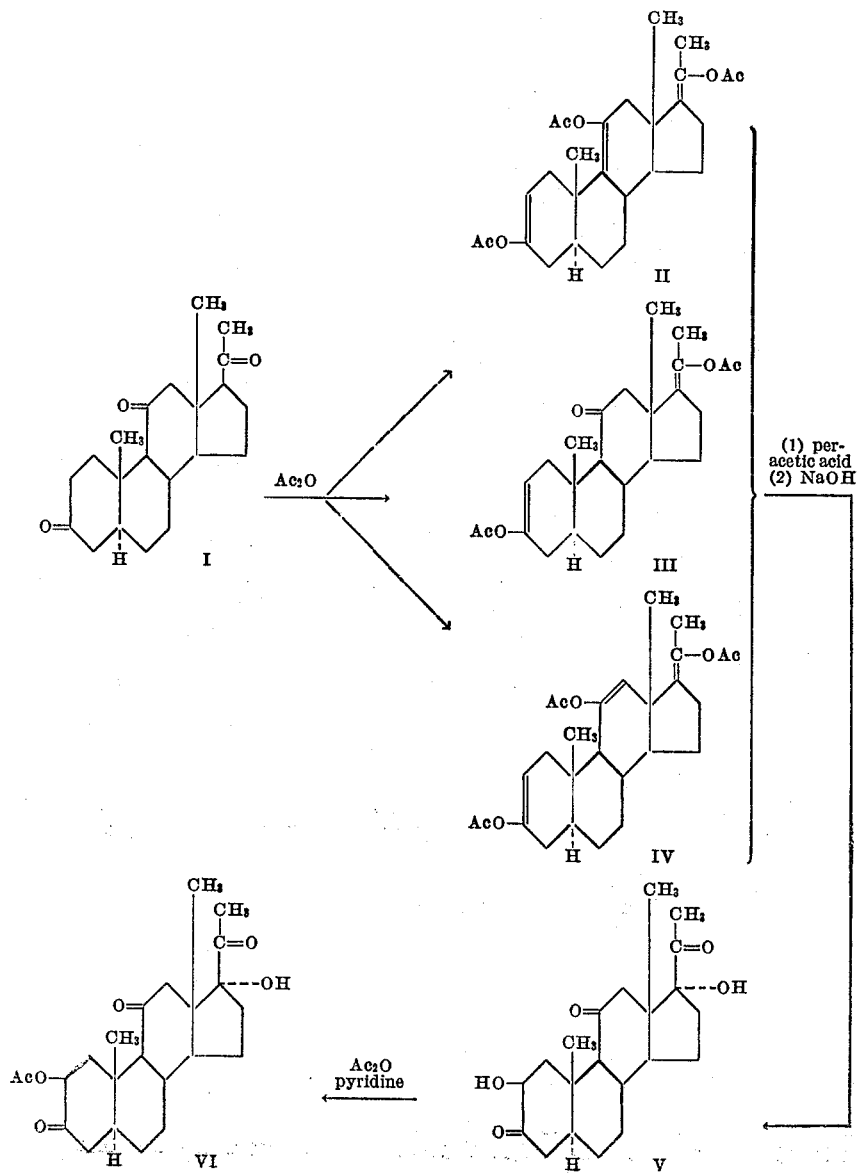

dride of an organic carboxylic acid, preferably containing from one to eight carbon atoms, or an acyl halide, preferably wherein the acyl group contains from one to eight carbon atoms, in the presence of a catalyst, to obtain an enol ester of allopregnane-3,11,20-trione (II, III, IV). The enol acylates thus-obtained are epoxidized with organic peracids or hydrogen peroxide and the 2(3),17(20)-dioxide compounds thus-formed are hydrolyzed with a base to produce 2,17α-dihydroxyallopregnane-3,11,20-trione (V), which can be esterified in conventional manner, such as with an acid anhydride in pyridine solution, to produce an acyloxy - 17α - hydroxyallopregnane - 3,11,20-trione.

An object of the present invention is to provide the novel 2-hydroxy-17α-hydroxyallopregnane-3,11,20-trione and 2-acyl esters thereof. Another object of the present invention is the provision of a process for the production of 2-hydroxy-17α-hydroxyallopregnane-3,11,20-trione and 2-acyl esters thereof. Other objects of the present invention will be apparent to those skilled in the art to which this invention pertains.

The novel compounds of the present invention have utility as stable solid intermediates, for example, for the synthesis of physiologically active compounds such as, for example, cortisone acetate. For this synthesis 2-acyloxy-17α-hydroxyallopregnane-3,11,20-trione is treated with bromine to form the 2-acyloxy-17α-hydroxy-21-bromoallopregnane-3,11,20-trione, which when treated with potassium acetate forms 2-acyloxy-17α - hydroxy - 21-acetoxyallopregnane - 3,11,20-trione. Careful pyrolysis of this compound furnishes 17α - hydroxy - 21 - acetoxy - 1 - allopregnene-3,11,20-trione which is then hydrogenated to give the known 17α-hydroxy-21-acetoxy - allopregnane - 3,11,20 - trione, which by bromination, treatment with sodium iodide in acetone and dehydrobromination is converted to cortisone acetate [Djerassi, Nature 168, 28 (1951)].

In carrying out the process of the present invention, allo-pregnane-3,11,20-trione is admixed with an organic carboxylic acid anhydride, the amount of anhydride being in excess of the amount theoretically required to produce the desired di- or tri-enol ester of allopregnane-3,11,20-trione, and the mixture is heated in the presence of a small amount of an acid catalyst such as paratoluenesulfonic acid, sulfosalicylic acid, or sulfuric acid, with para-toluenesulfonic acid being preferred.

The preferred carboxylic acid anhydride is acetic anhydride, but other anhydrides, such as propionic, butyric, valeric, isovaleric, hexanoic, heptanoic, octanoic, isooctanoic, benzoic, phenylacetic, and others are also operative. The acid anhydrides can also be substituted by groups which are nonreactive under the conditions of the process of the present invention, such as halo, alkyl, and methoxy groups, as in the case of chloroactic, orthotoluic and methoxybenzoic acid anhydrides. The amount of esterifying agent, i. e., the acid anhydride, is preferably substantially in excess of three molar equivalents to one molar equivalent of the starting allopregnane-3,11,20-trione where the tri-enol esters are desired. Where the di-enol esters of allo-pregnane-3,11,20-trione are desired, the ratio is preferably substantially in excess of two molar equivalents of the acid anhydride to one of the steroid starting material. The amount of acid catalyst, such as sulfuric acid, sulfonic acids, or the like, is not critical, and amounts from a small fraction of an equivalent to several molar equivalents can be advantageously employed.

The reaction is conveniently carried out by heating the reaction mixture to a temperature of about seventy to about 180 degrees centigrade. Reaction periods of between about one and about 24 hours may be employed, with three to eight hours being preferred. In forming the tri-enol esters, the higher temperature ranges are preferred and the acid anhydride employed is generally permitted to distill, at about 140 degrees centigrade in the case of acetic anhydride, for example, until the large excess of acetic anhydride initially present and the acetic acid which is formed during the reaction has been removed by distillation. In this manner, from fifty to about eighty percent of the acid anhydride employed may be distilled off. Where the particular acid anhydride has a boiling point substantially above 140 degrees centigrade the distillation may be carried out under reduced pressure, and therefore at a point below the distillation temperature of the esterification agent at normal atmospheric pressure so that undesirable side-reactions do not occur. Generally, milder reaction conditions are utilized in forming the di-enol esters and, therefore, a solvent such as toluene, benzene, xylene, or the like, which forms a lower boiling reaction mixture, is generally used.

Upon completion of the reaction, frequently evidenced by a change in color of the reaction solution from yellow to brown, or as indicated by titration of the acetic acid in the distillate, the reaction contents may be poured over crushed ice or into ice water and the desired enol ester recovered by conventional procedure. Extraction with ether, halogenated hydrocarbons, petroleum ether, benzene, or other solvents, with ether being preferred, followed by washing with successive portions of dilute alkali metal hydroxides or other basic solutions, such as dilute sodium carbonate, to remove excess acid anhydride, or acid corresponding to the anhydride employed, and drying over anhydrous materials such as sodium sulfate may be advantageously employed. The organic extract may be chromatographed, preferably on an alumina (aluminum oxide) column, and the di- or tri-enol ester recovered from the eluted chromatographic fractions. Alternatively, the enol ester can be recovered directly from the organic fraction by crystallization followed by recrystallization from glacial acetic acid, acetone, alcohol, petroleum ether, or other solvent. By still other separation procedures, the organic extract can be evaporated to dryness, and the residue taken up in alcohol, acetone, petroleum ether, or other solvent and the desired enol ester obtained by crystallization. In cases where a solvent such as toluene is used, extraction may not be necessary. Instead, the mixture of reaction products can be cooled, washed with dilute alkali and water, dried and evaporated to dryness. The residue may then be crystallized from any suitable solvent. It is sometimes preferred not to crystallize the enol ester, as the residue obtained after removal of the solvent is of sufficient purity to be used in subsequent reactions. Yields of up to seventy percent of both the di-and tri-enol esters of allopregnane-3,11,20-trione can be achieved using the process described and yields of above sixty percent are consistently obtained.

The thus-obtained di- and tri-enol esters of allopregnane-3,11,20-trione are converted to the corresponding 2(3),17(20)-di-epoxides by the use of an oxidant or epoxidation agent capable of furnishing the necessary oxygen. The agents most commonly used are the organic peracids or hydrogen peroxide. Organic peracids such as peracetic, perpropionic, perbenzoic, monoperphthalic, and others may be advantageously employed, with peracetic acid preferred. The epoxidation reaction is carried out by mixing the starting steroid, i. e., a di-enol acylate or a tri-enol acylate of allopregnane-3,11,20-trione, in a solvent inert under the reaction conditions employed, such as chloroform, acetic acid, carbon tetrachloride, ethylene chloride, methylene chloride, mixtures of ether and chloroform, or the like. The ratio of oxygen-furnishing agent to starting steroid can be varied considerably within broad ranges. Ratios of up to twenty moles or more of the peracid or the concentrated hydrogen peroxide to one mole of the starting enol ester are operative, with ratios of from about four to about twelve moles being preferred for attainment of optimum results, the precise ratio being preferably varied inversely with the reaction time employed. The reaction is carried out by the mixing together of the starting enol acylate and the peracid of choice, preferably peracetic acid or hydrogen peroxide, for a suitable period, e. g., from about one-half to about twenty-four hours, the proper length of time depending upon the concentration of oxygen-furnishing agent.

When a peracid is employed, any of the customary organic solvents in which the starting steroid is soluble can be used. Sometimes it is desirable to add to the oxidizing medium a small quantity of an alkali-metal salt such as, for example, sodium acetate. Temperatures between about zero and about 100 degrees centigrade can be conveniently used, with room temperature being entirely satisfactory in most cases. In general, if a high temperature is employed, the reaction time may be somewhat reduced. The reaction mixture may be agitated continuously, as, for example, by shaking with a rotary shaking device or other conventional stirring or agitation means. Alternatively, when temperatures above room temperature are employed, the reaction may be conducted on a steam bath.

The 2(3),17(20)-dioxido compounds can then be isolated in any convenient manner, such as by volatilizing the reaction medium, extracting the residue with chloroform, volatilizing the chloroform and recrystallizing the residue from any organic solvent which is non-reactive with the dioxide. Alternatively, the reaction products can be diluted with ether, washed with dilute base and water, dried, evaporated to dryness under vacuum, and redissolved in any convenient organic solvent from which the desired compound can be obtained upon crystallization.

The thus-produced 2(3),17(20)-dioxide of a di- or tri-enol acylate of allopregnane-3,11,20-trione is dissolved in an organic solvent which is substantially non-reactive under the conditions of the reaction, such as methanol, ethanol, dioxane, and others, ethanol being preferred. The resulting solution is then admixed with an aqueous solution of an alkali-metal hydroxide, such as sodium or potassium hydroxide, or other basic saponifying agents, with sodium hydroxide being preferred. The saponifying agent is usually present in excess of the amount theoretically required to saponify the starting dioxidosteroid, ratios, for example, between about three and about twenty moles of alkali-metal hydroxide to about one mole of starting compound being operative, the preferred ratio being about fifteen to one. The order of mixing of the steroid solution and aqueous saponifying solution is not significant, although ordinarily the aqueous saponifying solution is added to the starting steroid dissolved in an organic solvent. The resulting admixture is then permitted to stand for between about twenty minutes and about two hours or more, the exact time depending in part upon the temperature and in part upon the starting steroid employed, it being desirable to effect substantially complete saponification of the starting dioxide compound. Temperatures between about zero and about sixty degrees centigrade or higher may be employed, room temperatures being entirely satisfactory.

After saponification has been substantially completed, the contents of the reaction flask are generally neutralized with a dilute mineral acid, such as hydrochloric or sulfuric, ten percent hydrochloric acid being preferred. The neutralizing agent is usually added dropwise or in small portions until all of the excess base of the saponification is neutralized. In practice, the pH is generally brought to the acidic side. The organic solvent is next removed by conventional separation procedures, such as volatilizing or distilling under reduced pressures at below about sixty degrees centigrade or by other suitable means. When ethanol is the solvent employed, removal at below forty degrees centigrade is preferred. The desired 2,17α-dihydroxyallopregnane-3,11,20-trione is recovered from the residue in any convenient manner, such as by extraction with ether or other organic solvent, such as petroleum ether, chloroform, benzene, or the like, followed by conventional purification of the extracts by washing with dilute basic solutions, such as an alkali metal hydroxide or sodium carbonate solution and water, respectively, drying the organic fraction over anhydrous sodium sulfate and evaporating to dryness.

In order to obtain 2-acyloxy-17-hydroxyallopregnane-3,11,20-triones, 2,17α-dihydroxypregnane-3,11,20-trione is admixed with the acid chloride or acid anhydride of the organic carboxylic acid employed as the acylating agent. The acid anhydrides or chlorides of organic carboxylic acids containing up to eight carbon atoms, inclusive, are preferably employed as the acylating agent, such as the acid halides or anhydride of the fatty acids, cycloaliphatic acids, aromatic acids, and the like; the acid anhydride and the acid chloride of acetic acid being the preferred embodiment. In the case of formic acid, the free formic acid is usually employed as the acylating agent. The order of mixing is not critical, and the amount of acid chloride or anhydride employed is at least the theoretical amount, and ordinarily substantially in excess of the amount theoretically required to produce the desired 2-acylate. Ratios as high as fifty or sixty molar parts of acylating agent to one molar part of 2,17α-di-hydroxyallopregnane-3,11,20-trione are operative. Frequently, it is desirable to employ an esterification catalyst, preferably a basic compound, such as pyridine.

The reaction mixture is then permitted to stand, with or without stirring, at temperatures between about zero and about 100 degrees centigrade, temperatures between about twenty and about forty degrees centigrade being preferred, for periods of time varying between about one and about 24 hours, the precise reaction period depending in part upon the temperature employed, the acylating agent, and esterification catalyst, if any, utilized in conducting the reaction. Preferably, the reaction mixture is permitted to stand between about eight and about twenty-four hours, when temperatures between about twenty and about forty degrees are employed.

The desired 2-acyloxy-17α-hydroxypregnane-3,11,20-trione is then separated by any convenient means, such as by extraction with an organic solvent which is non-reactive with the reaction products, as, for example, ether, petroleum ether, benzene, chloroform, methylene chloride, or the like, followed by conventional purification of the extracts by washing with dilute basic solutions, such as dilute alkali metal hydroxide or sodium carbonate solution, and water, respectively, drying the organic fraction over anhydrous sodium sulfate and evaporating to dryness. From this residue, the desired 2-acyloxy-17α-hydroxyallopregnane-3,11,20-trione is obtained by conventional procedures such as crystallization from a solvent or a mixture of solvents, or, alternatively, by chromatographic adsorption over activated charcoal, alumina, or Florisil (magnesium silicate), the latter chromatographic precedure being preferred.

The following examples are illustrative of the products of the present invention but are not to be construed as limiting.

*Example 1.—2 - acetoxy - 17α - hydroxyallopregnane-3,11,20-trione*

A solution of 3.07 grams of allopregnane-3,11,20-trione and 1.24 grams of para-toluenesulfonic acid monohydrate in 312 milliliters of acetic anhydride was heated to a temperature of about 140 degrees centigrade, at which temperature distillation of the acetic anhydride began. Distillation was then continued at a slow rate for a period of five hours at the end of which time sixty milliliters of reaction mixture remained in the flask. The contents of the flask were cooled, poured into ice-water and extracted with ether. The ether extract was washed with dilute sodium carbonate solution and water, and then dried and passed through a column of alumina. The column was eluted with ether and the eluate concentrated.

The solid mixture of enol acetates of allopregnane-3,11,20-trione thus obtained was dissolved in 27 milliliters of chloroform and to the resulting solution was added 14.4 milliliters of forty percent peracetic acid in which 0.384 gram of sodium acetate had been dissolved. The resulting mixture was shaken for a period of ninety minutes on a rotary agitating machine and the reaction mixture then diluted with 100 milliliters of ether. The reaction contents were washed with dilute sodium bicarbonate solution and water respectively, dried over anhydrous sodium sulfate, and evaporated to dryness.

The 2(3),17(20)-dioxides of the enol acetates of allopregnane-3,11,20-trione were dissolved in 180 milliliters of ethanol and to the resulting solution was added a solution of 3.6 grams of sodium hydroxide in 180 milliliters of water. After standing at about room temperature for forty minutes, the reaction mixture was made slightly acid with ten percent hydrochloric acid solution added in small portions, and the resulting slightly acidic mixture then distilled under reduced pressure at a temperature below forty degrees centigrade until all the ethanol had been removed. The reaction residue was then extracted with ether, the extracts combined and washed with fifty-milliliter portions of dilute sodium bicarbonate solution and water, respectively, dried over anhydrous sodium sulfate and evaporated to dryness. This gave 1.76 grams of crude 2,17α - dihydroxyallopregnane-3,11,20-trione.

The crude 2,17α-dihydroxyallopregnane-3,11,20-trione was dissolved in 25 milliliters of pyridine and 25 milliliters of acetic anhydride and the resulting mixture permitted to stand overnight at room temperature. The reaction mixture was then poured into ice-water and repeatedly extracted with ether. The extracts were combined, washed with successive 100-milliliter portions of five percent sodium bicarbonate solution and water, respectively, dried over anhydrous sodium sulfate and evaporated to dryness. The resulting residue was recrystallized from an ethyl acetate-hexane (Skellysolve B) mixture and yielded 2-acetoxy-17α-hydroxyallopregnane-3,11,20-trione of melting point 228 to 235 degrees centigrade.

*Example 2.—2-propionoxy-17α-hydroxyallopregnane-3,11,20-trione*

Allopregnane-3,11,20-trione was added to a mixture of propionic anhydride and chlorobenzenesulfonic acid and the resulting mixture heated to approximately 163 degrees centigrade, at which temperature distillation of the propionic anhydride began. Distillation of the propionic anhydride was then continued at a slow rate for a period of six hours. The contents of the flask were cooled, poured into ice-water and extracted with ether. The ether extract was washed with dilute sodium caronate solution and water, respectively, dried, and passed over a column of alumina. The enol-propionates of allopregnane-3,11,20-trione were recovered from the eluates from the column by distilling off the solvent.

Treatment of the enol-propionates of allopregnane-3,11,20-trione with perbenzoic acid as described in Example 1, resulted in the production of 2(3),17(20)-dioxides of the enol-propionates of allopregnane-3,11,20-trione.

Hydrolysis of the enol-propionates of allopregnane-3,11,20-trione with dilute potassium hydroxide solution at room temperature yielded 2,17α-dihydroxyallopregnane-3,11,20-trione.

Crude 2,17α - dihydroxyallopregnane-3,11,20-trione was dissolved in pyridine, and propionic anhydride was added thereto. After standing for 24 hours at room temperature, the reaction mixture was poured into water and extracted. 2 - propionoxy-17α-hydroxyallopregnane-3,11,20-trione was obtained from the extracts.

Following the procedures described in Examples 1 and 2, other 2-acylates of 2,17α-dihydroxyallopregnane - 3,11,20 - trione can be prepared by esterification of the 2,17α-dihydroxyallopregnane-3,11,20-trione with an acid anhydride, an acyl halide or formic acid if the 2-formyloxy derivative is desired. Representative 2 - acyloxy-17α-hydroxyallopregnane-3,11,20-triones thus prepared are: 2-formyloxy-17α-hydroxyallopregnane - 3,11,20 - trione, 2-butyroxy-17α-hydroxyallopregnane-3,11,20-trione, 2-valeroxy - 17α - hydroxyallopregnane - 3,11,20 - trione, 2-hexanoyloxy - 17α - hydroxyallopregnane-3,11,20-trione, 2-heptanoyloxy-17α-hydroxyallopregnane-3,11,20-trione, 2-octanoyloxy-17α-hydroxyallopregnane-3,11,20-trione, 2 - benzoyloxy-17α-hydroxyallopregnane-3,11,20-trione, 2-(β-cyclopentyl)-propionoxy - 17α - hydroxyallopregnane-3,11,20-trione, and other like 2-acyloxy-17α-hydroxyallopregnane-3,11,20-triones.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 2,17α-dihydroxyallopregnane-3,11,20-trione and 2-acyloxy-17α-hydroxyallopregnane-3,11,20-trione wherein the 2-acyloxy radical is AcO, Ac being the acyl radical of a hydrocarbon carboxylic acid containing from one to eight carbon atoms, inclusive.

2. 2,17α-dihydroxyallopregnane-3,11,20-trione.

3. A 2 - acyloxy - 17α - hydroxyallopregnane - 3,11,20-trione wherein the acyloxy group is AcO, Ac being the acyl radical of a hydrocarbon carboxylic acid containing from one to eight carbon atoms, inclusive.

4. 2 - acetoxy - 17α - hydroxyallopregnane - 3,11,20-trione.

5. 2 - propionoxy - 17α - hydroxyallopregnane - 3,11,20-trione.

6. In a process for the production of a compound selected from the group consisting of 2,17α-dihydroxyallopregnane-3,11,20-trione and 2-acyloxy-17α-hydroxyallopregnane-3,11,20-trione, the steps of heating together, at a temperature between about seventy and about 180 degrees centigrade, allopregnane-3,11,20-trione and the anhydride of an organic carboxylic acid containing from one to eight carbon atoms, inclusive, in the presence of an acid catalyst; mixing the thus-obtained enol acylates of allopregnane-3,11,20-trione with an epoxidizing agent selected from the group consisting of organic peracids and hydrogen peroxide to obtain the 2(3),17(20)-dioxide of enol acylates of allopregnane-3,11,20-trione; and hydrolyzing with a base the thus-produced 2(3),17(20)-dioxide of enol acylates of allopregnane-3,11,20-trione to obtain 2,17α-dihydroxyallopregnane-3,11,20-trione.

GEORGE B. SPERO.
ROBERT H. LEVIN.

No references cited.